(12) United States Patent
Fontvielle et al.

(10) Patent No.: US 10,412,328 B2
(45) Date of Patent: *Sep. 10, 2019

(54) SYSTEMS AND METHODS FOR ROLLING SHUTTER COMPENSATION USING ITERATIVE PROCESS

(71) Applicant: GoPro, Inc., San Mateo, CA (US)

(72) Inventors: Adrien Fontvielle, Goncelin (FR); Sophana Kok, Voisins-le-Bretonneux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,290

(22) Filed: Jan. 25, 2019

(65) Prior Publication Data
US 2019/0158768 A1 May 23, 2019

Related U.S. Application Data

(63) Continuation of application No. 15/439,257, filed on Feb. 22, 2017, now Pat. No. 10,194,101.

(51) Int. Cl.
*H04N 5/357* (2011.01)
*H04N 5/353* (2011.01)
*G06T 3/60* (2006.01)

(52) U.S. Cl.
CPC ............. *H04N 5/357* (2013.01); *G06T 3/60* (2013.01); *H04N 5/3532* (2013.01); *H04N 5/3535* (2013.01)

(58) Field of Classification Search
CPC .... H04N 5/357; H04N 5/3535; H04N 5/3532; G06T 5/006; G06T 3/60; G06T 3/608
See application file for complete search history.

(56) References Cited

U.S. PATENT DOCUMENTS 5,260,779 A  11/1993  Wasserman
5,555,895 A   9/1996  Ulmer
(Continued)

FOREIGN PATENT DOCUMENTS

EP  0605045 A1  7/1994
EP  0650299 A1  4/1995
(Continued)

OTHER PUBLICATIONS

Mai Zheng et al, Stitching Video from Webcams, Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, p. 420-429, ISBN 978-3-540-89645-6, XP019112243.
(Continued)

*Primary Examiner* — Timothy J Henn
(74) *Attorney, Agent, or Firm* — Esplin & Associates, PC

(57) ABSTRACT

Image captured with an image capture device with a rolling shutter may be deformed due to changes in imaging sensor orientation during image capture. Image deformities may occur due to rolling shutter that exposes rows of pixels to light at slightly different times during image capture. Deformities such as wobble, for example, and/or other deformities may be corrected by constructing an output image. The output image may be constructed by determining corresponding pixels within the input image. The location of the input pixel may be determined by performing one or more fixed point iterations to identify one or more input pixels within the input image. A value of the output pixel within the output image may be determined based on a value of a corresponding pixel within the input image.

20 Claims, 6 Drawing Sheets

(56) References Cited

U.S. PATENT DOCUMENTS

| | | |
|---|---|---|
| 6,434,265 B1 | 8/2002 | Xiong |
| 6,486,908 B1 | 11/2002 | Chen |
| 6,710,740 B2 | 3/2004 | Needham |
| 6,711,293 B1 | 3/2004 | Lowe |
| 6,788,333 B1 | 9/2004 | Uyttendaele |
| 7,057,663 B1 | 6/2006 | Lee |
| 7,403,224 B2 | 7/2008 | Fuller |
| 7,983,502 B2 | 7/2011 | Cohen |
| 8,411,166 B2 | 4/2013 | Miyata |
| 8,606,073 B2 | 12/2013 | Woodman |
| 8,670,030 B2 | 3/2014 | Tanaka |
| 8,842,197 B2 | 9/2014 | Singh |
| 8,890,954 B2 | 11/2014 | ODonnell |
| 8,896,694 B2 | 11/2014 | O'Donnell et al. |
| 9,019,396 B2 | 4/2015 | Kiyoshige |
| 9,158,304 B2 | 10/2015 | Fleck |
| 9,342,534 B2 | 5/2016 | Singh |
| 9,409,646 B2 | 8/2016 | Fleck |
| 9,473,758 B1 | 10/2016 | Long |
| 9,602,795 B1 | 3/2017 | Matias |
| 10,194,101 B1* | 1/2019 | Fontvieille ............... H04N 5/357 |
| 2002/0112005 A1 | 8/2002 | Namias |
| 2002/0122113 A1 | 9/2002 | Foote |
| 2002/0191087 A1 | 12/2002 | Hashimoto |
| 2003/0085992 A1 | 5/2003 | Arpa |
| 2003/0098954 A1 | 5/2003 | Amir |
| 2003/0160862 A1 | 8/2003 | Charlier |
| 2004/0010804 A1 | 1/2004 | Hendricks |
| 2004/0017492 A1 | 1/2004 | Stavely |
| 2004/0021780 A1 | 2/2004 | Kogan |
| 2004/0047606 A1 | 3/2004 | Mikawa |
| 2004/0075738 A1 | 4/2004 | Burke |
| 2004/0135900 A1 | 7/2004 | Pyle |
| 2004/0169724 A1 | 9/2004 | Ekpar |
| 2005/0033760 A1 | 2/2005 | Fuller |
| 2005/0062869 A1 | 3/2005 | Zimmermann |
| 2005/0104976 A1 | 5/2005 | Currans |
| 2005/0134707 A1 | 6/2005 | Perotti |
| 2005/0289111 A1 | 12/2005 | Tribble |
| 2006/0050997 A1 | 3/2006 | Imamura |
| 2007/0030358 A1 | 2/2007 | Aoyama |
| 2007/0053659 A1 | 3/2007 | Kiyama |
| 2007/0120986 A1 | 5/2007 | Nunomaki |
| 2007/0140662 A1 | 6/2007 | Nunomaki |
| 2007/0154202 A1 | 7/2007 | Lee |
| 2007/0300249 A1 | 12/2007 | Smith |
| 2008/0094499 A1 | 4/2008 | Ueno |
| 2008/0118100 A1 | 5/2008 | Hayashi |
| 2009/0160957 A1 | 6/2009 | Deng |
| 2009/0202177 A1 | 8/2009 | Jeffrey |
| 2009/0210707 A1 | 8/2009 | De Lutiis |
| 2009/0251558 A1 | 10/2009 | Park |
| 2009/0262206 A1 | 10/2009 | Park |
| 2009/0271447 A1 | 10/2009 | Shin |
| 2010/0045773 A1 | 2/2010 | Ritchey |
| 2010/0097443 A1 | 4/2010 | Lablans |
| 2010/0238304 A1 | 9/2010 | Miyata |
| 2010/0250022 A1 | 9/2010 | Hines |
| 2010/0289924 A1 | 11/2010 | Koshikawa |
| 2010/0299630 A1 | 11/2010 | McCutchen |
| 2011/0013778 A1 | 1/2011 | Takumai |
| 2011/0115883 A1 | 5/2011 | Kellerman |
| 2011/0141300 A1 | 6/2011 | Stec |
| 2011/0176014 A1 | 7/2011 | Hong |
| 2011/0176043 A1 | 7/2011 | Baker |
| 2011/0261227 A1 | 10/2011 | Higaki |
| 2011/0267514 A1* | 11/2011 | D'Angelo ............ H04N 5/2329 348/296 |
| 2012/0092559 A1 | 4/2012 | Ubillos |
| 2012/0206565 A1 | 8/2012 | Villmer |
| 2012/0244798 A1 | 9/2012 | Mcardle |
| 2013/0021450 A1 | 1/2013 | Yoshizawa |
| 2013/0058532 A1 | 3/2013 | White |
| 2013/0058619 A1 | 3/2013 | Miyakawa |
| 2013/0127903 A1 | 5/2013 | Paris |
| 2013/0176403 A1 | 7/2013 | Varga |
| 2013/0177168 A1 | 7/2013 | Inha |
| 2013/0182177 A1 | 7/2013 | Furlan |
| 2013/0210563 A1 | 8/2013 | Hollinger |
| 2013/0235226 A1 | 9/2013 | Karn |
| 2014/0037268 A1 | 2/2014 | Ryota Shoji |
| 2014/0039884 A1 | 2/2014 | Wei-Ge Chen |
| 2014/0071299 A1* | 3/2014 | Grundmann ............ G06T 5/003 348/207.1 |
| 2014/0240122 A1 | 8/2014 | Roberts |
| 2015/0055937 A1 | 2/2015 | Van Hoff |
| 2015/0058102 A1 | 2/2015 | Christensen |
| 2015/0142211 A1 | 5/2015 | Shehata |
| 2015/0142742 A1 | 5/2015 | Hong |
| 2015/0166476 A1 | 6/2015 | Chen |
| 2015/0186073 A1 | 7/2015 | Pacurariu |
| 2015/0189221 A1 | 7/2015 | Nakase |
| 2015/0287435 A1 | 10/2015 | Land |
| 2015/0288754 A1 | 10/2015 | Mosko |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0005435 A1 | 1/2016 | Campbell |
| 2016/0018822 A1 | 1/2016 | Nevdahs |
| 2016/0031559 A1 | 2/2016 | Zang |
| 2016/0054737 A1 | 2/2016 | Soll |
| 2016/0076892 A1 | 3/2016 | Zhou |
| 2016/0098469 A1 | 4/2016 | Allinson |
| 2016/0101856 A1 | 4/2016 | Kohstall |
| 2016/0112713 A1 | 4/2016 | Russell |
| 2016/0129999 A1 | 5/2016 | Mays |
| 2016/0139596 A1 | 5/2016 | Na |
| 2016/0139602 A1 | 5/2016 | Kohstall |
| 2016/0165563 A1 | 6/2016 | Jang |
| 2016/0179096 A1 | 6/2016 | Bradlow |
| 2016/0189101 A1 | 6/2016 | Kantor |
| 2016/0234438 A1 | 8/2016 | Satoh |
| 2016/0239340 A1 | 8/2016 | Chauvet |
| 2016/0269621 A1 | 9/2016 | Cho |
| 2016/0295108 A1 | 10/2016 | Cao |
| 2016/0304198 A1 | 10/2016 | Jourdan |
| 2016/0306351 A1 | 10/2016 | Fisher |
| 2016/0313734 A1 | 10/2016 | Enke |
| 2016/0327950 A1 | 11/2016 | Bachrach |
| 2016/0336020 A1 | 11/2016 | Bradlow |
| 2016/0366290 A1 | 12/2016 | Hoshino |
| 2017/0048334 A1 | 2/2017 | Shibahara |
| 2017/0236257 A1 | 8/2017 | Wu |
| 2017/0272668 A1* | 9/2017 | Ribardo, Jr. ......... H04N 5/3532 |
| 2017/0332018 A1 | 11/2017 | Bell |

FOREIGN PATENT DOCUMENTS

| | | |
|---|---|---|
| EP | 0661672 A1 | 7/1995 |
| EP | 2334058 | 9/2016 |
| WO | 2009047572 A1 | 4/2009 |
| WO | 2010073192 | 7/2010 |
| WO | 2014090277 A1 | 6/2014 |

OTHER PUBLICATIONS

Farin et al., "Shortest Circular Paths on Planar Graphs," In 27th Symposium on Information Theory in the Benelux 2006, 8 pgs.

Zhi et al., "Toward Dynamic Image Mosaic Generation VVith Robustness to Parallax," IEEE Transactions on Image Processing, vol. 21, No. 1, Jan. 2012, pp. 366-378.

Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

Perazzi et al., "Panoramic Video from Unstructured Camera Arrays," Eurographics, vol. 34 (2015), No. 2, 12pgs.

(56) References Cited

OTHER PUBLICATIONS

U.S. Appl. No. 14/920,427, filed Oct. 22, 2015, entitled "Apparatus and Methods for Embedding Metadata Into Video Stream" 62 pages.
U.S. Appl. No. 14/949,786, filed Nov. 23, 2015, entitled "Apparatus and Methods for Image Alignment" 67 pages.
U.S. Appl. No. 14/927,343, filed Oct. 29, 2015, entitled "Apparatus and Methods for Rolling Shutter Compensation for Multi-Camera Systems" 45 pages.
U.S. Appl. No. 15/001,038, filed Jan. 19, 2016, entitled "Metadata Capture Apparatus and Methods" 54 pages.
PCT International Search Report for PCT/EP2014/061897 dated Sep. 15, 2014, 3 pages.
PCT International Search Report for PCT/EP2014/058008 dated May 26, 2014, 3 pages.
PCT International Search Report for PCT/EP2014/057352 dated Jun. 27, 2014, 3 pages.
Foote J et al, 'FlyCam: practical panoramic video and automatic camera control', Multimedia and Expo, 2000. ICME 2000. 2000 IEEE International Conference on New York, NY, USA Jul. 30-Aug. 2, 2000, Piscataway, NJ, USA,IEEE, US, (Jul. 30, 2000), vol. 3, doi:10.1109/ICME.2000.871033, ISBN 978-0-7803-6536-0, pp. 1419-1422, XP010512772.
Hossein Afshari et al: 'The Panoptic Camera: A Plenoptic Sensor with Real-Time Omnidirectional Capability', Journal of Signal Processing Systems, vol. 70, No. 3, Mar. 14, 2014 (Mar. 14, 2014), pp. 305-328, XP055092066, ISSN: 1939-8018, DOI: 10.1007/s11265-012-0668-4.
Benjamin Meyer et al, 'Real-time Free-Viewpoint Navigation from Compressed Multi-Video Recordings', Proc. 3D Data Processing, Visualization and Transmission (3DPVT), (May 31, 2010), pp. 1-6, URL: http://www.cg.cs.tu-bs.de/media/publications/meyer2010realtime.pdf, (Dec. 3, 2013), XP055091261.
O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.
O'Donovan, A., et al., "Real Time Capture of Audio Images and their Use with Video," 2007 IEEE Workshop on Applications of Signal Processing to Audio and Acoustics, Oct. 21-24, 2007, pp. 10-13.
"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.
Lipski, C.: 'Virtual video camera', SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.
PCT International Search Report and Written Opinion for PCT/US15/38913, dated Sep. 29, 2015, 15 Pages.
Felix Klose et al, 'Stereoscopic 3D View Synthesis From Unsynchronized Multi-View Video', Proc. European Signal Processing Conference (EUSIPCO), Barcelona, Spain, (Sep. 2, 2011), pp. 1904-1909, URL: http://www.cg.cs.tu-bs.de/media/publications/eusipco2011_3d_synth.pdf, (Dec. 3, 2013), XP055091259.
Wang, Yu-Shuen, et al., "Optimized Scale-and-Stretch for Image Resizing", ACM Transactions on Graphics (TOG), ACM, vol. 27, No. 5, Article 118, Dec. 1, 2008, XP002609797, 8 pages.
Hwang, Daw-Sen, et al., "Content-Aware Image Resizing Using Perceptual Seam Carving with Human Attention Model", International Conference on Multimedia and Expo, 2008 IEEE, Piscataway, NJ, Jun. 23, 2008, XP032965469, pp. 1029-1032.
Avidan, S., et al., "Seam Carving for Content-Aware Image Resizing", ACM Transactions on Graphics (TOG), ACM, vol. 26, No. 3, Article 10, Jul. 1, 2007, XP007904203, 10 pages.
Butler et al, "Texture Mapping" [online]. Carnegie Mellon University, 2015 [retrieved on Feb. 1, 2018]. Retrieved from the Internet: <URL: https://web.archive.org/web/20151007042049/https://www.cs.cmu.edu/afs/cs/academic/class/15462-f09/www/lec/lec10.pdf >, 9 pages.

\* cited by examiner

SYSTEMS AND METHODS FOR ROLLING SHUTTER COMPENSATION USING ITERATIVE PROCESS

FIELD OF THE INVENTION

The disclosure relates generally to image processing and more particularly to systems and methods for rolling shutter correction using an iterative image correction process.

BACKGROUND OF THE INVENTION

Images captured with CMOS sensors and/or other sensors use a rolling shutter that exposes rows of pixels to light at slightly different times during image capture. This slight temporal shift between each row start may result in a deformed image caused by image capture device motion. Some image correction solutions may not account for high frequency image capture device motion and require dedicated hardware.

SUMMARY

One or more aspects of the present disclosure relate to performing image correction for rolling shutter. Image correction may include correction of image deformities such as wobble, for example, and/or other deformities. Image deformities may occur due to rolling shutter that exposes rows of pixels to light at slightly different times during image capture. Corrected image may account for image capture device movement between exposures of rows of pixels.

Image capture component may be configured to obtain one or more input images captured by one or more imaging sensors of one or more image capture devices. By way of non-limiting illustration, an input image may be obtained from an imaging sensor of an image capture device.

One or more imaging sensors used to capture the input image may be one or more rigidly mounted active pixel sensors such as CMOS and/or other sensors. The input image captured by the imaging sensor may comprise an array of pixels. The input image captured by the imaging sensor may comprise photosites or pixels acquired at slightly different moments in time. Contents of pixels in the pixel array may be captured on a row-by-row basis so that contents of an individual row of pixels may be captured after a time delay relative to the acquisition of contents of another row of pixels within the array. Although the rolling shutter configuration described in this application involves row-by-row capture this is not intended to be limiting, and the concepts described herein are equally applicable to any image sensor that captures or "reads out" photosites or pixels on a subset-by-subset basis regardless of whether or not the subsets are rows.

Pixels of the pixel array may be characterized by pixel contents. Pixel contents may include pixel position information specifying the individual pixel positions within the pixel array. Pixel position within the array may be expressed in terms of x and y coordinates, and/or other coordinate schemes. Contents of pixels in the pixel array may include pixel values within the pixel array. Pixel value may include a numeric representation associated with specific colors in a color space (e.g., RGB, CMYK, and/or other color spaces).

In some implementations, the image capture device may include a lens. The lens may be configured to provide light waves to the imaging sensor. The lens may be characterized by a lens projection. In some implementations, the image may be configured based on the lens projection and the input image may be configured in an equirectangular projection and/or other lens projection. In some implementations, the lens projection may be characterized by a rectilinear transformation and/or other lens projection.

The imaging sensor may typically capture an image over a time window configured between approximately 4 milliseconds and 1000 milliseconds, depending on an exposure and/or an image frame rate. During image capture, the imaging sensor performs row-by-row capture of pixel values wherein a given row of pixels of the image may be sampled at a given time. The row-to-row delay may result in a "rolling shutter" effect, where objects in the resultant image (i.e. the input image) may be skewed (tilted to the left or right, depending on the direction of image capture device or subject movement).

The acquisition time component may be configured to obtain acquisition time specifying time of capture of one or more sets of pixels within the pixel array of the input image. Pixel acquisition time may be determined using an imaging sensor internal clock and/or imaging sensor configurations. Imaging sensor configurations may determine a maximum frame rate and/or other imaging sensor parameters. Pixel acquisition time may be determined based on image exposure duration and position of the pixel in the image array (pixel row index). The acquisition time component may be configured to associate acquisition time specifying time of capture of one or more sets of pixels within the pixel array with row locations corresponding to pixels in the input image.

The orientation component may be configured to obtain one or more orientation information specifying imaging sensor orientations at the acquisition times of the sets of input pixels within the input pixel array. The orientation component may be configured to obtain orientation information based on an analysis of the first pixel row of the input image and the second pixel row of the input image. In some implementations, the orientation component may be configured to be coupled to an orientation sensor. The orientation sensor may comprise one or more of a gyroscope, accelerometer, and/or other orientation sensors.

The orientation sensor (IMU) may be configured to provide orientation information of the image capture device. The orientation sensor may comprise one or more of a gyroscope, accelerometer, and/or other orientation sensors. The motion of the image capture device may cause changes in the image capture device orientation when different portions (e.g., different rows) of the input image are captured.

Images may capture image capture device movements during image acquisition which may result in deformities caused by changes in orientation of the imaging sensor at the pixel acquisition time instance. Image deformities may be corrected by determining the changes in orientation of the imaging sensor at the pixel acquisition time instance. Obtaining orientation of the imaging sensor at the pixel acquisition time instance may be used in correcting the input image deformities associated with the motion of the image capture devise. It will be recognized by those skilled in the arts that various other image characteristics configured for individual input images, including but not limited to lens aperture, exposure value, depth of focus, color content, image sharpness, saturation, white balance, field of view, resolution, image size, lens projection (e.g., equirectangular, rectilinear), and/or other parameters may be used when correcting image deformities.

The output pixel array component may be configured to determine an output pixel array based on the input image.

The output pixel array may represent a pixel array of the input image obtained by the input image component that has been transformed to account for changes in the imaging sensor orientation at different acquisition times, as described in U.S. patent application Ser. No. 15/387,468, which is incorporated by reference in its entirety.

By way of non-limiting illustration, a first output cell may be determined based on a first orientation information specifying a first imaging sensor orientation obtained at a first acquisition time of first set of pixels of the input image. The output pixel array component may be configured to determine a second output cell based on differences between the first output cell (determined based on the first orientation information specifying the first imaging sensor orientation obtained at the first acquisition time of first set of pixels of the input image) and a second orientation information specifying a second imaging sensor orientation obtained at a second acquisition time of a second pixel of the input image.

The iteration component may be configured to determine an output image based on the output pixel array and the input image. The output image may represent corrected input image obtained by the input image component by determining a location of a pixel within the input image corresponding to a location of a pixel within the output pixel array obtained by the output pixel array component by performing one or more fixed point iterations. The iteration component may be configured to determine pixel locations on a sensor line y within the input image using imaging sensor orientations R(y) at a time the imaging sensor has acquired a row of pixels in the input image corresponding to the output cell within the output pixel array. Sensor line y may correspond to the x-axis of the input pixel array expressed in terms of x and y coordinates, and/or other positions. The iteration component may be configured to determine pixel locations on an imaging sensor line y within the input image by performing one or more fixed point iterations.

In some implementations, a pixel location within the input image may be determined using fixed point iterations expressed as $y_{n+1}=f(y_n)$, n=1, 2, 3, . . . N. In one or more implementations, number of iterations may be determined on a difference between sensor line $y_n$ of a given iteration and sensor line $y_{n-1}$ of a preceding iteration. Number of iterations may be limited until no significant difference between successive $y_n$ is found.

In some implementations, during an initial iteration n=1, imaging sensor orientation R(y) may be used by the iteration component. At a subsequent iteration n>1, a pixel may be selected in the output pixel array. A corresponding row $y_{n+1}$ of the input image may be determined using fixed point iteration process.

The iteration component may be configured to determine output pixel positions by performing one or more fixed point iterations to identify one or more input pixels within the input image that correspond to one or more pixels in the output pixel array. The iteration component may be configured to determine output pixel values based on pixel values of the input image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
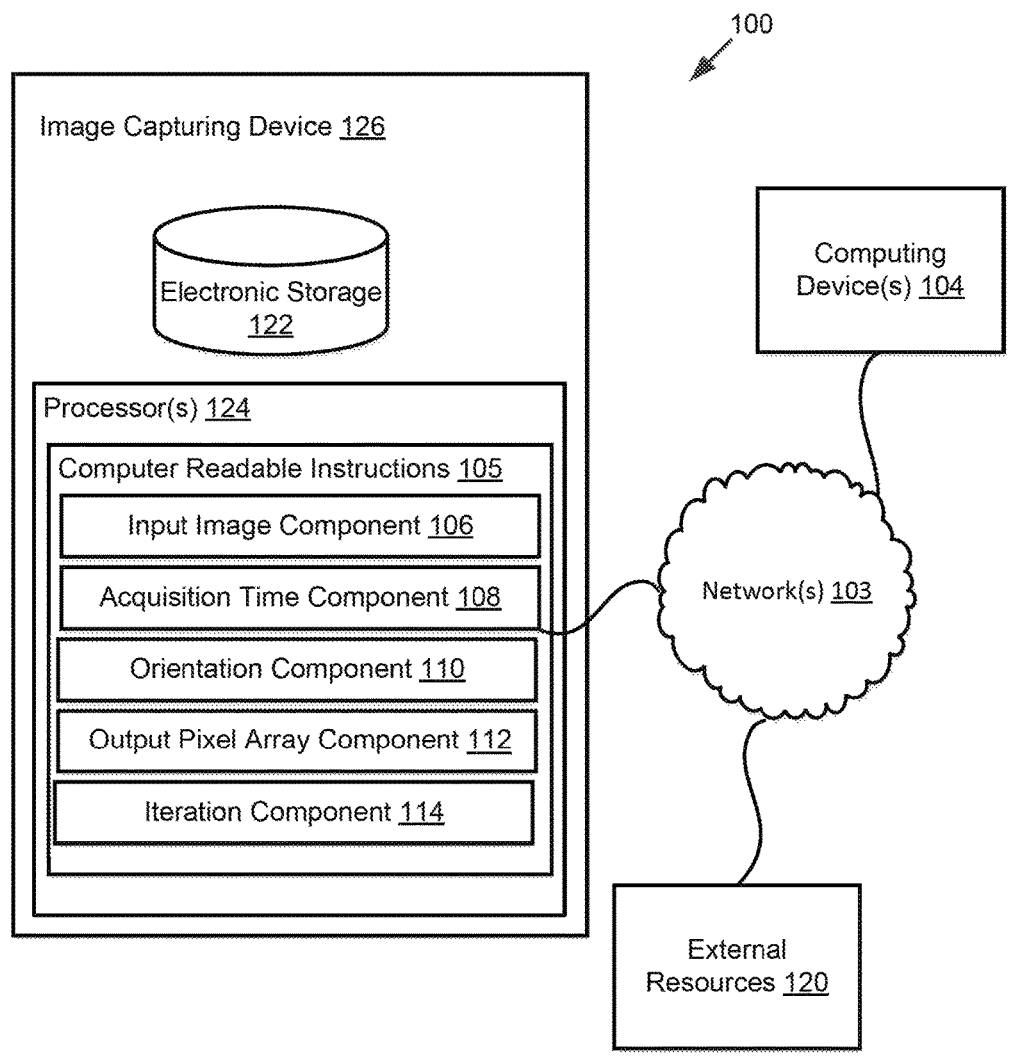
FIG. 1 illustrates a system for performing image correction for rolling shutter, in accordance with one or more implementations.

FIG. 1 illustrates system 100 configured to perform image correction for rolling shutter, in accordance with one or more implementations. As is illustrated in FIG. 1, system 100 may include one or more image capture device 126. Image capture device 126 may be configured to communicate with one or more client computing platforms 104 and/or one or more server(s) according to a client/server architecture. The users of system 100 may access image capture device 126 directly via image capture device 126 and/or indirectly with one or more server(s) via client computing platform(s) 104. Image capture device 126 may be configured to execute one or more computer program components. The computer program components may include one or more of input image component 106, acquisition time component 108, orientation component 110, output pixel array component 112, iteration component 114 and/or other components.

Users may capture images using image capture device 126. Image capture device 126 may include one or more of a computing platform, a mobile device (e.g., a smart phone, a tablet, and/or other mobile device), a camera (e.g., an action camera, a sports camera, and/or other type of camera), a video recorder, and/or other device configured to capture images and/or video segments. Image capture device 126 may include one or more sensors including one or more of a GPS, a gyro, a compass, an accelerometer, a temperature sensor, a pressure sensor, a depth sensor, imaging sensor, a sound transducer, and/or other sensors. One or more sensors may be located external to image capture device 126 and may provide information obtained via the one or more sensors external to image capture device 126.

Input image component 106 may be configured to obtain one or more input images captured by one or more imaging sensors of one or more image capture devices. By way of non-limiting illustration, an input image may be obtained from an imaging sensor of an image capture device.

One or more imaging sensors used to capture the input image may be one or more rigidly mounted active pixel sensors such as CMOS and/or other sensors. Such imaging sensors may be produced by a complementary metal-oxide-semiconductor (CMOS) technology for constructing integrated circuits and hence may be referred to as the CMOS image sensor.

The input image captured by the imaging sensor may comprise an array of pixels. The input image captured by the imaging sensor may comprise of photosites or pixels acquired at slightly different moments in time. Contents of pixels in the pixel array may be captured on a row-by-row basis so that contents of an individual row of pixels may be captured after a time delay relative to the acquisition of contents of another row of pixels within the array. Although the rolling shutter configuration described in this application involves row-by-row capture this is not intended to be limiting, and the concepts described herein are equally applicable to any image sensor that captures or "reads out" photosites or pixels on a subset-by-subset basis regardless of whether or not the subsets are rows.

Pixels of the pixel array may be characterized by pixel contents. Pixel contents may include pixel position information specifying the individual pixel positions within the pixel array. Pixel position within the array may be expressed in terms of x and y coordinates, and/or other coordinate schemes. Contents of pixels in the pixel array may include pixel values within the pixel array. Pixel value may include a numeric representation associated with specific colors in a color space (e.g., RGB, CMYK, and/or other color spaces). For example, a pixel having a value of (1, 0, 0) in the RGB color space may be associated with a pure red color. Other types of pixel values may control opacity and/or other information for the pixel.

In some implementations, the image capture device may include a lens. The lens may be configured to provide light waves to the imaging sensor. The lens may be characterized by a lens projection. In some implementations, the input image may be configured based on the lens projection and the input image may be configured in an equirectangular projection and/or other lens projection. In some implementations, the lens projection may be characterized by a rectilinear transformation and/or other lens projection.

The imaging sensors may typically capture an image over a time window configured between approximately 4 milliseconds and 1000 milliseconds, depending on an exposure and/or an image frame rate. During image capture, the imaging sensor performs row-by-row capture of pixel values wherein a given row of pixels of the image may be sampled at a given time. The row-to-row delay may result in a "rolling shutter" effect, where objects in the resultant image (i.e. the input image) may be skewed (tilted to the left or right, depending on the direction of image capture device or subject movement). For example, when tracking a car moving at high speed, the car may not appear distorted but the background may appear tilted.

In some implementations, images obtained by imaging sensors characterized by row-by-row image acquisition process may be applicable to other sensor technologies and/or to other image configurations. By way of a non-limiting illustration, an imaging sensor may comprise two or more imaging sensor components wherein the first imaging sensor component may sense incoming waves (e.g., light, radio frequency waves, pressure waves) at a first time instance, while the second image sensor component may sense the incoming waves at a second time instance, e.g., subsequent to the first time instance. For example, an imaging sensor may comprise two charge-couple device (CCD) imaging sensor components (e.g., one covering one (e.g., left) portion of a view field and one covering another (e.g., right) portion of the view) configured to acquire pixels at two time instances (e.g., first pixels of one CCD imaging sensor component and subsequently pixels of the other CCD imaging sensor component).

In some implementations, an imaging sensor may be configured to acquire (scan) a portion of an image at a given time. The image portion may include multiple pixels arranges in a variety of configurations, e.g., multiple rows, partial row, polygon, frame-like, and/or other shapes.

In some implementations, imaging sensor may be configured to capture images using exposure duration parameter and/or other parameters. Exposure duration parameter may be configured in accordance with a variety of parameters, image acquisition rate (frame rate), amount of light (ambient and/or flash), sensor sensitivity setting (e.g., ISO setting), sensor dimension, and/or other parameters. In some implementations, exposure time may be configured from the range between ⅕₀₀ of a second to 120 seconds. In some implementations, the row-to row acquisition time (transfer time) parameter may be configured based on sensor pixel resolution, frame rate, and/or other imaging sensor parameters; and may be selected between 2 microsecond (us) and 10,000 us.

Acquisition time component 108 may be configured to obtain acquisition time specifying time of capture of one or more sets of pixels within the pixel array of the input image. Pixel acquisition time may be determined using an imaging sensor internal clock and/or imaging sensor configurations. Imaging sensor configurations may determine a maximum frame rate and/or other imaging sensor parameters. Pixel acquisition time may be determined based on image exposure duration and position of the pixel in the image array (pixel row index). By way of a non-limiting illustration, a first acquisition time specifying a time of capture of a first set of pixels may be obtained within a pixel array of the input image. Acquisition time component 108 may be configured to obtain a second acquisition time specifying a time of capture of a second set of pixels within the pixel array of the input image. Acquisition time component may be configured to associate acquisition time specifying time of capture of one or more sets of pixels within the pixel array with row locations corresponding to pixels in the input image.

Acquisition time component 108 may be configured to associate acquisition time specifying time of capture of one or more sets of pixels within the pixel array with row locations corresponding to pixels in the input image. By way of a non-limiting illustration, a first acquisition time may be associated with a first row of the input image. Acquisition time component 108 may be configured to associate a second acquisition time with a second row of the input image.

Figure 2:
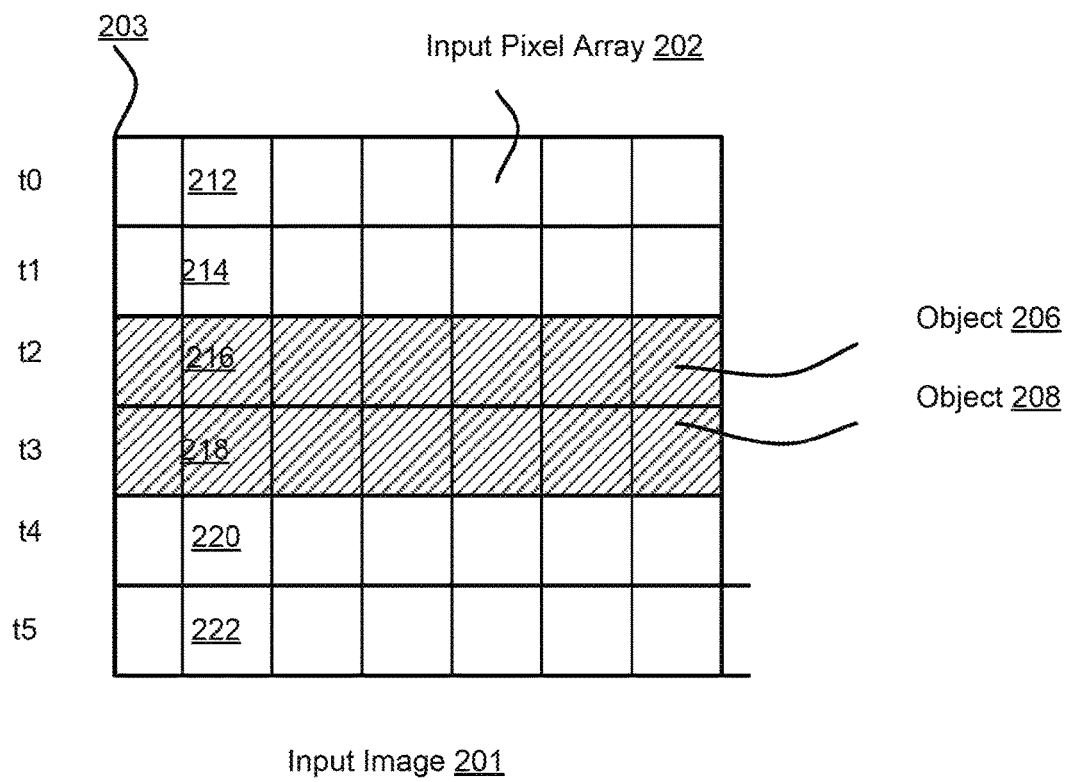
FIG. 2 illustrates an exemplary representation of a timing delay associated with a CMOS imaging system, in accordance with one or more implementations.

For example, and as illustrated in FIG. 2, different acquisition times may be associated with a row-by-row scan of an imaging sensor during an input image capture by an image capture device. Input image 201 illustrates an image of an object, denoted by horizontal lines, obtained with the image capture device. Input image 201 may comprise input pixel array 202. Input pixel array 202 may further comprise rows of pixels 212, 214, 216, 218, and 220 corresponding to rows of pixels within input pixel array 202 captured by an imaging sensor at acquisition times t0, t1, t2, t3, t4, and t5, respectively. Input image 201 may comprise representation 206 of the object. Input image 201 may comprise representation 208 of the object. Representation 206 may correspond to pixel row 216 of input pixel array 202 of input image 201. Representation 208 may correspond to pixel row 218 of input pixel array 202 in input image 201.

As illustrated in FIG. 2, pixel row 218 may occur (e.g., be sampled) subsequent to pixel row 216 relative frame start time (e.g., point in time denoted 203 in FIG. 2). Object representation 206 may correspond to pixels acquired at time instant t2 and object representation 208 may correspond to pixels acquired at time instant t3. Time instant t2 may be associated with pixel row 216 having object representation 206 and time instant t3 may be associated with pixel row 218 having object representation 208.

Referring again to FIG. 1, orientation component 110 may be configured to obtain one or more orientation information specifying imaging sensor orientations at the acquisition times of the sets of input pixels within the input pixel array. By way of a non-limiting illustration, a first orientation information specifying a first imaging sensor orientation may be obtained at a first acquisition time of a first set of pixels of the input image. Orientation component 110 may be configured to obtain a second orientation information specifying a second imaging sensor orientation at a second acquisition time of a second set of pixels with a row of pixels of the input image.

Orientation component 110 may be configured to obtain orientation information based on an analysis of the first pixel row of the input image and the second pixel row of the input image. In some implementations, orientation component 110 may be configured to be coupled to an orientation sensor. The orientation sensor may comprise one or more of a gyroscope, accelerometer, and/or other orientation sensors.

The orientation sensor (IMU) may be configured to provide orientation information. The orientation sensor may comprise one or more of a gyroscope, accelerometer, and/or other orientation sensors. The motion of the image capture device may cause changes in the image capture device orientation when different portions (e.g., different rows) of the input image are captured.

Figure 3:
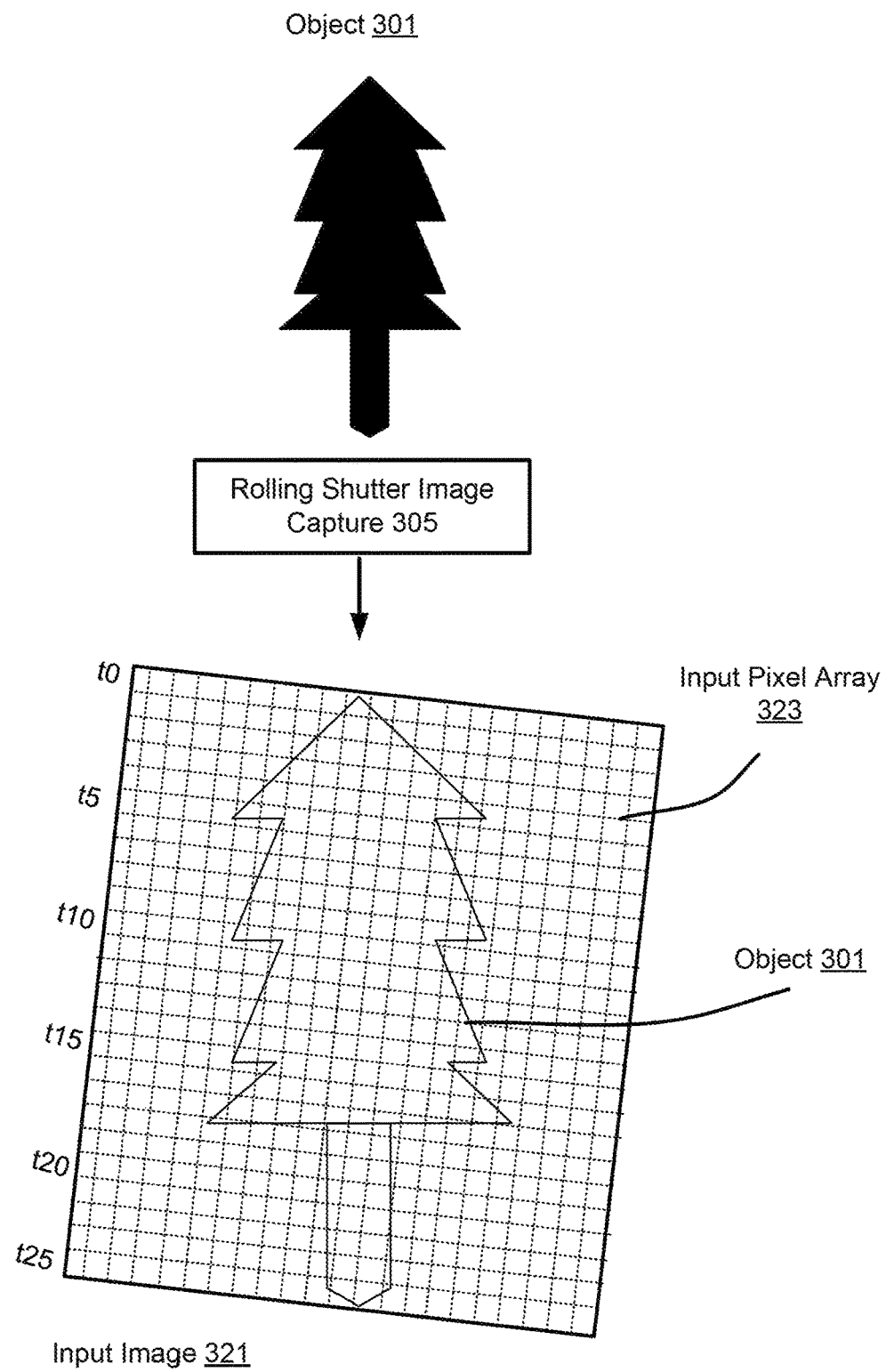
FIG. 3 illustrates an exemplary representation of an input image pixel array associated with an input image, in accordance with one or more implementations.

Images may reflect image capture device movements during image acquisition, which may result in image deformities caused by changes in orientation of the imaging sensor at the pixel acquisition time instance. For example, and as illustrated in FIG. 3, object 301 may be captured by an image device having using an imaging sensor that performs row-by-row capture of pixel values wherein a given row of pixels within input pixel array 323 of resulting input image 321 may be sampled at a given time. The motion and/or orientation change of the image capture device during the image capture process may result in a deformed or skewed input image pixel array 323 in relation to object 301.

Image deformities may be corrected by determining the changes in orientation of the sensor at the pixel acquisition time instance. Obtaining orientation of the imaging sensor at the pixel acquisition time instance may be used in correcting the input image deformities associated with the motion of the image capture devise. It will be recognized by those skilled in the arts that various other image characteristics configured for individual input images, including but not limited to lens aperture, exposure value, depth of focus, color content, image sharpness, saturation, white balance, field of view, resolution, image size, lens projection (e.g., equirectangular, rectilinear), and/or other parameters may be used when correcting image deformities.

Image capture device imaging sensor orientation R(y), at the time of capturing a given row of the image (row y), may depend on the image capture device's rotation and transfer time (the time between the capture of subsequent rows in the image capture device). In some implementations, the transfer time may be determined during image capture device manufacturing and/or testing. In one or more implementations, the transfer time may be estimated by minimizing the projection error of overlapping parts of two or more source images. The projection error may be determined based on a measured of an average distance between matched control points using a key point detector methodology, such as SIFT-based key point detector methodology and/or other methodology.

In some implementations, wherein the orientation information may be available at time intervals that may be greater than the row acquisition and transfer time interval an interpolation process may be applied to the orientation information in order to obtain orientation corresponding to the row acquisition time instant. The interpolation process may include selection of a closest in time value, linear interpolation, quadratic interpolation and/or other method.

Output pixel array component 112 may be configured to determine an output pixel array based on the input image. The output pixel array may represent a pixel array of the input image obtained by input image component 106 that has been transformed to account for changes in the imaging sensor orientation at different acquisition times, as described in U.S. patent application Ser. No. 15/387,468, which is incorporated by reference in its entirety.

By way of non-limiting illustration, a first output cell may be determined based on a first orientation information specifying a first imaging sensor orientation obtained at a first acquisition time of first set of pixels of the input image. Output pixel array component 112 may be configured to determine a second output cell based on differences between the first output cell (determined based on the first orientation information specifying the first imaging sensor orientation obtained at the first acquisition time of first set of pixels of the input image) and a second orientation information specifying a second imaging sensor orientation obtained at a second acquisition time of a second pixel of the input image.

Iteration component 114 may be configured to determine an output image based on the output pixel array and the input image. The output image may represent corrected input image obtained by input image component 106 by determining a location of a pixel within the input image corresponding to a location of a pixel within the output pixel array obtained by output pixel array component 112 by performing one or more fixed point iterations.

Iteration component 114 may be configured to determine pixel locations on a sensor line y within the input image using imaging sensor orientations R(y) at a time the imaging sensor has acquired a row of pixels in the input image corresponding to the output cell within the output pixel array. Iteration component 114 may be configured to determine pixel locations on an imaging sensor line y within the input image by performing one or more fixed point iterations.

In some implementations, a pixel location within the input image may be determined using fixed point iterations expressed as $y_{n+1}=f(y_n)$, n=1, 2, 3, . . . N. Number of iterations N may be selected between 3 and 11, in some implementations. In one or more implementations, number of iterations may be determined on a difference between sensor line $y_n$ of a given iteration and sensor line $y_{n-1}$ of a preceding iteration. Number of iterations may be limited until no significant difference between successive $y_n$ is found.

In some implementations, during an initial iteration n=1, imaging sensor orientation R(y) may be used by iteration component 114. At a subsequent iteration n>1, a pixel may be selected in the output pixel array. A corresponding row $y_{n+1}$ of the input image may be determined using fixed point iteration process.

Figure 4:
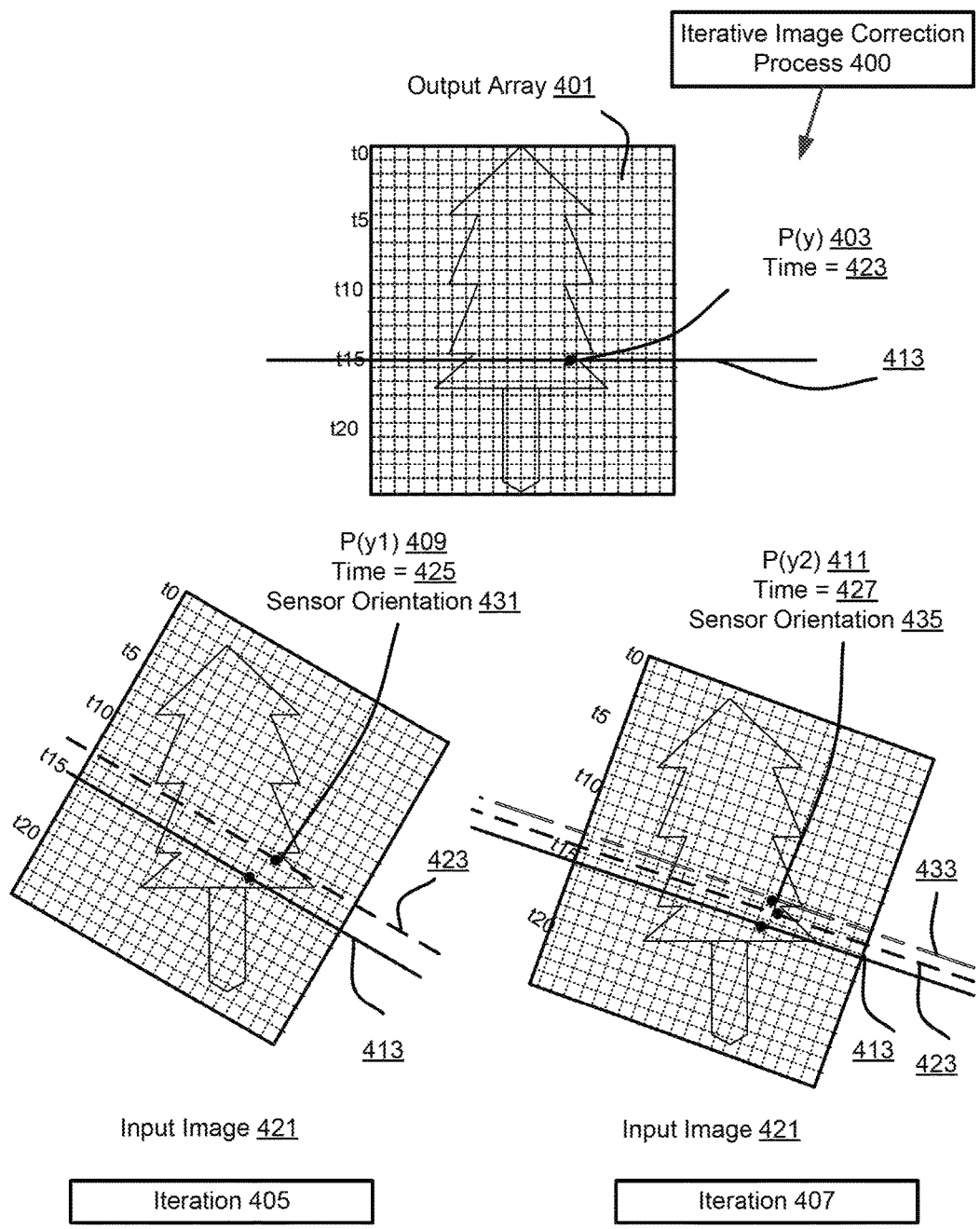
FIG. 4 illustrates an exemplary schematic of output image determined via iterative image correction process, in accordance with one or more implementations.

For example, and as illustrated by FIG. 4, iterative process may determine pixel locations within input image 421 using imaging sensor orientations at a time an imaging sensor has acquired a row of pixels in input image 421 corresponding to output pixel 403 within the output pixel array 401. Output pixel 403 within output pixel array 401 may be acquired at time 423. Output pixel 403 may be located on sensor line 413 within output pixel array 401.

At iteration 405, it may be determined that sensor line 413 may be acquired at acquisition time 425 within input image 421. Imaging sensor orientation at acquisition time 425 may be interpolated as 431 and output pixel 403 may correspond to pixel 409 within input image 421 with orientation 431. Pixel 409 may be located on sensor line 413 within input image 421.

At iteration 407, it may be determined that sensor line 413 may be acquired at acquisition time 427 within input image 421. Imaging sensor orientation acquired at acquisition time 427 may be interpolated as 435 and output pixel 403 may correspond to pixel 411 within input image 421 with orientation 435. Pixel 411 may be located on sensor line 433 within input image 421. By performing fixed point iteration process 400, thus, pixel 411 may be determined as corresponding to output pixel 403 within output pixel array 401.

Referring again to FIG. 1, iteration component 114 may be configured to determine output pixel positions by performing one or more fixed point iterations to identify one or more input pixels within the input image that correspond to one or more pixels in the output pixel array. Iteration component 114 may be configured to determine output pixel values based on pixel values of the input image.

Figure 5:
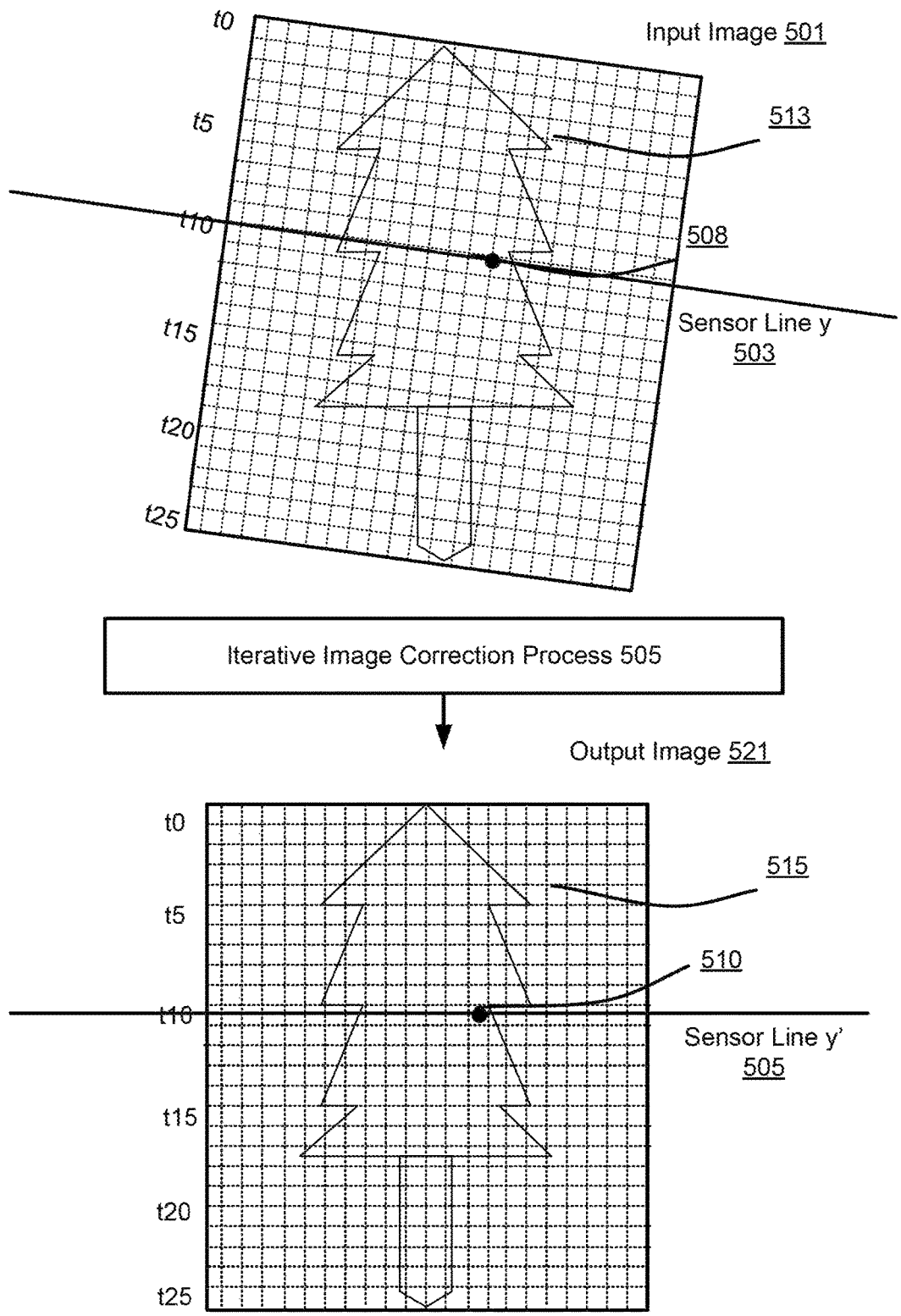
FIG. 5 illustrates an exemplary schematic of iterations of performed during iterative image correction process, in accordance with one or more implementations.

For example, and as illustrated by FIG. 5, output image 521 may represent a corrected input image 501 such that image deformities caused by changes in imaging sensor orientation have been corrected. Output image 521 may include output pixel array 515. Output pixel array 515 may comprise one or more output pixels, such as output pixel 510, as illustrated by FIG. 5. Output pixel 510 may be characterized by a position within output pixel array 515 and an output pixel value. Output pixel 510 may be positioned within output pixel array 515 at sensor line 505. Output pixel position 505 may be determined by performing one or more fixed point iterations within input image 501 and correspond to pixel 508 located at sensor line 503 of input pixel array 513 of input image 501 (e.g., as illustrated in FIG. 4). The value of output pixel 510 of output image 521 may be determine based on a value of input pixel 508 of input image 501.

Referring again to FIG. 1, in some implementations, image capture device 126, client computing platform(s) 104, and/or external resources 120 may be operatively linked via one or more electronic communication links. For example, such electronic communication links may be established, at least in part, via network 103 such as the Internet and/or other networks. It will be appreciated that this is not intended to be limiting, and that the scope of this disclosure includes implementations in which image capture device 126, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Image capture device 126 may include electronic storage 122, one or more processors 124, and/or other components. Image capture device 126 may include communication lines, or ports to enable the exchange of information with a network and/or other computing platforms. Illustration of image capture device 126 FIG. 1 is not intended to be limiting. Image capture device 126 may include a plurality of hardware, software, and/or firmware components operating together to provide the functionality attributed herein to image capture device 126.

Electronic storage 122 may include electronic storage media that electronically stores information. The electronic storage media of electronic storage 122 may include one or both of system storage that is provided integrally (i.e., substantially non-removable) with image capture device 126 and/or removable storage that is connectable to image capture device 126 via, for example, a port (e.g., a USB port, a Firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Electronic storage 122 may be a separate component within image capture device 126, or electronic storage 122 may be provided integrally with one or more other components of within image capture device 126 (e.g., processor 124). Although electronic storage 122 is shown in FIG. 1 as a single entity, this is for illustrative purposes only. In some implementations, electronic storage 122 may comprise a plurality of storage units. These storage units may be physically located within the same device, or electronic storage 122 may represent storage functionality of a plurality of devices operating in coordination. Electronic storage 122 may include one or more virtual storage resources (e.g., cloud storage, a virtual private network, and/or other virtual storage resources). Electronic storage 122 may store software algorithms, information determined by processor(s) 124, information received from image capture device 126, information received from client computing platform(s) 104, and/or other information that enables system 100 to function as described herein.

Processor(s) 124 may be configured to provide information processing capabilities in image capture device 126. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114 and/or other components. The processor(s) 124 may be configured to execute components 106, 108, 110, 112, 114 and/or other components by software; hardware; firmware; some combination of software, hardware, and/or firmware; and/or other mechanisms for configuring processing capabilities on processor(s) 124.

It should be appreciated that although components 106, 108, 110, 112 and/or 114 are illustrated in FIG. 1 as being co-located within a single processing unit, in implementations in which processor(s) 124 includes multiple processing units, one or more of components 106, 108, 110, 112 and/or 114 may be located remotely from the other components. The description of the functionality provided by the different components 106, 108, 110, 112 and/or 114 described herein is for illustrative purposes, and is not intended to be limiting, as any of components 106, 108, 110, 112 and/or 114 may provide more or less functionality than is described. For example, one or more of components 106, 108, 110, 112 and/or 114 may be eliminated, and some or all of its functionality may be provided by other ones of components 106, 108, 110, 112 and/or 114. As another example, processor(s) 124 may be configured to execute one or more additional components that may perform some or all of the functionality attributed herein to one of components 106, 108, 110, 112 and/or 114.

Figure 6:
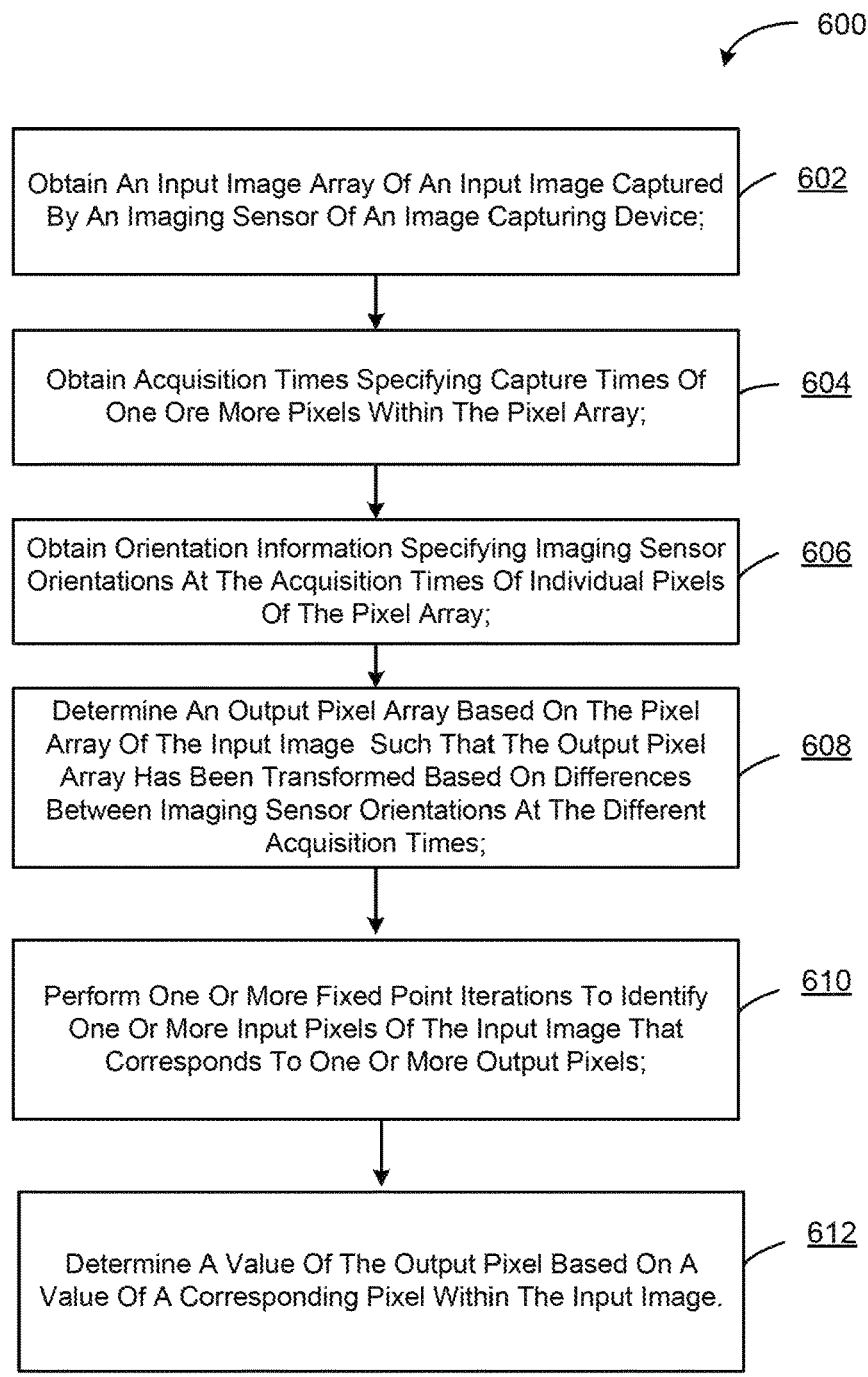
FIG. 6 illustrates a method for performing image correction for rolling shutter, in accordance with one or more implementations.

FIG. 6 illustrates a method 600 for performing image correction for rolling shutter, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an input image array of an input image captured by an imaging sensor an imaging capture device may be obtained. Operation 602 may be performed by one or more physical processors executing an input image component that is the same as or similar to input image component 106, in accordance with one or more implementations.

At an operation 604, a first acquisition time specifying capture times of a first pixel within the pixel array may be obtained and/or a second acquisition time specifying capture times of a second pixel within the pixel array may be obtained. Operation 604 may be performed by one or more physical processors executing an acquisition time component that is the same as or similar to acquisition time component 108, in accordance with one or more implementations.

At an operation 606, a first orientation information specifying imaging sensor orientation at the first acquisition time of the first pixel may be obtained and/or a second orientation information specifying imaging sensor orientation at the second acquisition time of the second pixel may be obtained. Operation 606 may be performed by one or more physical processors executing an orientation component that is the same as or similar to orientation component 110, in accordance with one or more implementations.

At an operation 608, an output pixel array of output cells based on the input pixel array may be determined. The cells of the output pixel array may be transformed based on differences between imaging sensor orientations at the different acquisition times within the input image. Operation 608 may be performed by one or more physical processors executing an output pixel array component that is the same as or similar to output pixel array component 112, in accordance with one or more implementations.

At an operation 610, one or more fixed point iterations to identify one or more input pixels within the input pixel array of the input image that corresponds to one the output pixels may be performed. At an operation 612, a value of the output pixel based on a value of a corresponding pixel within the input image may be determined. Operations 610 and 612 may be performed by one or more physical processors executing an iteration component that is the same as or similar to iteration component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for correcting digital image deformities, the system comprising:
   one or more physical processors configured by machine readable instructions to:
      obtain an input image defined by an input pixel array, the input pixel array captured by an imaging sensor, the input pixel array including input pixels characterized by input pixel positions within the input pixel array and input pixel values;

obtain acquisition times specifying time of capture of sets of input pixels within the input pixel array;

obtain orientation information specifying imaging sensor orientations at the acquisition times of the sets of input pixels within the input pixel array;

determine an output image defined by an output pixel array, the output pixel array determined based on the input pixel array of the input image, the output pixel array including output pixels characterized by output pixel positions within the output pixel array and output pixel values, wherein determination of a given output pixel includes:

(a) determining an acquisition time and an orientation information of the given output pixel within the output pixel array;

(b) obtaining identification of an input pixel based on the acquisition time and the orientation information of the given output pixel, the input pixel having a pixel position within the input pixel array;

(c) obtaining an input acquisition time of the input pixel based on the pixel position within the input pixel array;

(d) determining input orientation information of the input pixel based on the input acquisition time;

(e) obtaining identification of a subsequent input pixel based on the input orientation information;

(f) iterating over operations (c)-(e) for one or more other pixels of the input pixel array; and (g) obtaining identification of a pixel within the input pixel array as an estimated input pixel based on differences in the input orientation information; and determining the output pixel values for the given output pixel based on the input pixel values for the estimated input pixel.

2. The system of claim 1, wherein the output pixel array includes multiple cells that correspond to the input pixels in the input pixel array, the individual cells in the output pixel array being characterized by two-dimensional coordinates and identification of corresponding ones of the input pixel array.

3. The system of claim 1, wherein identification of pixels of the input pixel array corresponding to individual cells in the output pixel array includes specification of individual input pixel positions in the input pixel array.

4. The system of claim 3, wherein the individual input pixel positions are identified based on the individual orientation information.

5. The system of claim 4, wherein individual output pixels within the output pixel array are determined by obtaining identification of the estimate input pixel within the input pixel array based on the iteration process such that for a given iteration, each subsequent pixel within the input pixel array is determined based on orientation information of a previous pixel determined at another iteration preceding the given iteration.

6. The system of claim 1, wherein a number of iterations in the iteration process is determined based on orientation information of one or more pixels in one or more successive iterations.

7. The system of claim 1, wherein the imaging sensor is configured to obtain the orientation information.

8. The system of claim 7, wherein the imaging sensor is configured to be coupled to an orientation sensor, the orientation sensor comprising one or more of a gyroscope and/or accelerometer.

9. The system of claim 1, wherein the imaging sensor comprises an array of rows of photosites configured based on a CMOS imaging process wherein a time of acquiring content of a given row of photosites of the array is delayed relative to a time instance of acquiring content of another row of photosites of the array.

10. The system of claim 1, wherein the output pixel array comprises at least 64 cells.

11. A method of correcting digital image deformities, the method comprising:

obtaining an input image defined by an input pixel array, the input pixel array captured by an imaging sensor, the input pixel array including input pixels characterized by pixel positions within the input pixel array and input pixel values;

obtaining acquisition times specifying time of capture of sets of input pixels within the input pixel array;

obtaining orientation information specifying imaging sensor orientations at the acquisition times of the sets of input pixels within the input pixel array;

determining an output image defined by an output pixel array, the output pixel array determined based on the input pixel array of the input image, the output pixel array including output pixels characterized by output pixel positions within the output pixel array and output pixel values, wherein determination of a given output pixel includes:

(a) determining an acquisition time and an orientation information of the given output pixel within the output pixel array;

(b) obtaining identification of an input pixel based on the acquisition time and the orientation information of the given output pixel, the input pixel having a pixel position within the input pixel array;

(c) obtaining an input acquisition time of the input pixel based on the pixel position within the input pixel array;

(d) determining input orientation information of the input pixel based on the input acquisition time;

(e) obtaining identification of a subsequent input pixel based on the input orientation information;

(f) iterating over operations (c)-(e) for one or more other pixels of the input pixel array; and (g) obtaining identification of a pixel within the input pixel array as an estimated input pixel based on differences in the input orientation information; and determining the output pixel values for the given output pixel based on the input pixel values for the estimated input pixel.

12. The method of claim 11, wherein the output pixel array includes multiple cells that correspond to the input pixels in the input pixel array, the individual cells in the output pixel array being characterized by two-dimensional coordinates and identification of corresponding ones of the input pixel array.

13. The method of claim 11, wherein identification of pixels of the input pixel array corresponding to individual cells in the output pixel array includes specification of individual input pixel positions in the input pixel array.

14. The method of claim 13, wherein the individual input pixel positions are identified based on the individual orientation information.

15. The method of claim 14, wherein individual output pixels within the output pixel array are determined by obtaining identification of the estimate input pixel within the input pixel array based on the iteration process such that for a given iteration, each subsequent pixel within the input pixel array is determined based on orientation information of a previous pixel determined at another iteration preceding the given iteration.

16. The method of claim 11, wherein a number of iterations in the iteration process is determined based on orientation information of one or more pixels in one or more successive iterations.

17. The method of claim 11, wherein the imaging sensor is configured to obtain the orientation information.

18. The method of claim 17, wherein the imaging sensor is configured to be coupled to an orientation sensor, the orientation sensor comprising one or more of a gyroscope and/or accelerometer.

19. The method of claim 11, wherein the imaging sensor comprises an array of rows of photosites configured based on a CMOS imaging process wherein a time of acquiring content of a given row of photosites of the array is delayed relative to a time instance of acquiring content of another row of photosites of the array.

20. The method of claim 11, wherein the output pixel array comprises at least 64 cells.

\* \* \* \* \*